Nov. 26, 1935. H. P. ELLIOTT 2,022,540
APPARATUS FOR CUTTING STENCIL CARDS FROM TYPE PLATES
Filed Nov. 10, 1933 4 Sheets-Sheet 1

INVENTOR
Harmon P. Elliott.
BY
*R. Parker Smith*
ATTORNEY

Nov. 26, 1935.  H. P. ELLIOTT  2,022,540
APPARATUS FOR CUTTING STENCIL CARDS FROM TYPE PLATES
Filed Nov. 10, 1933     4 Sheets-Sheet 2
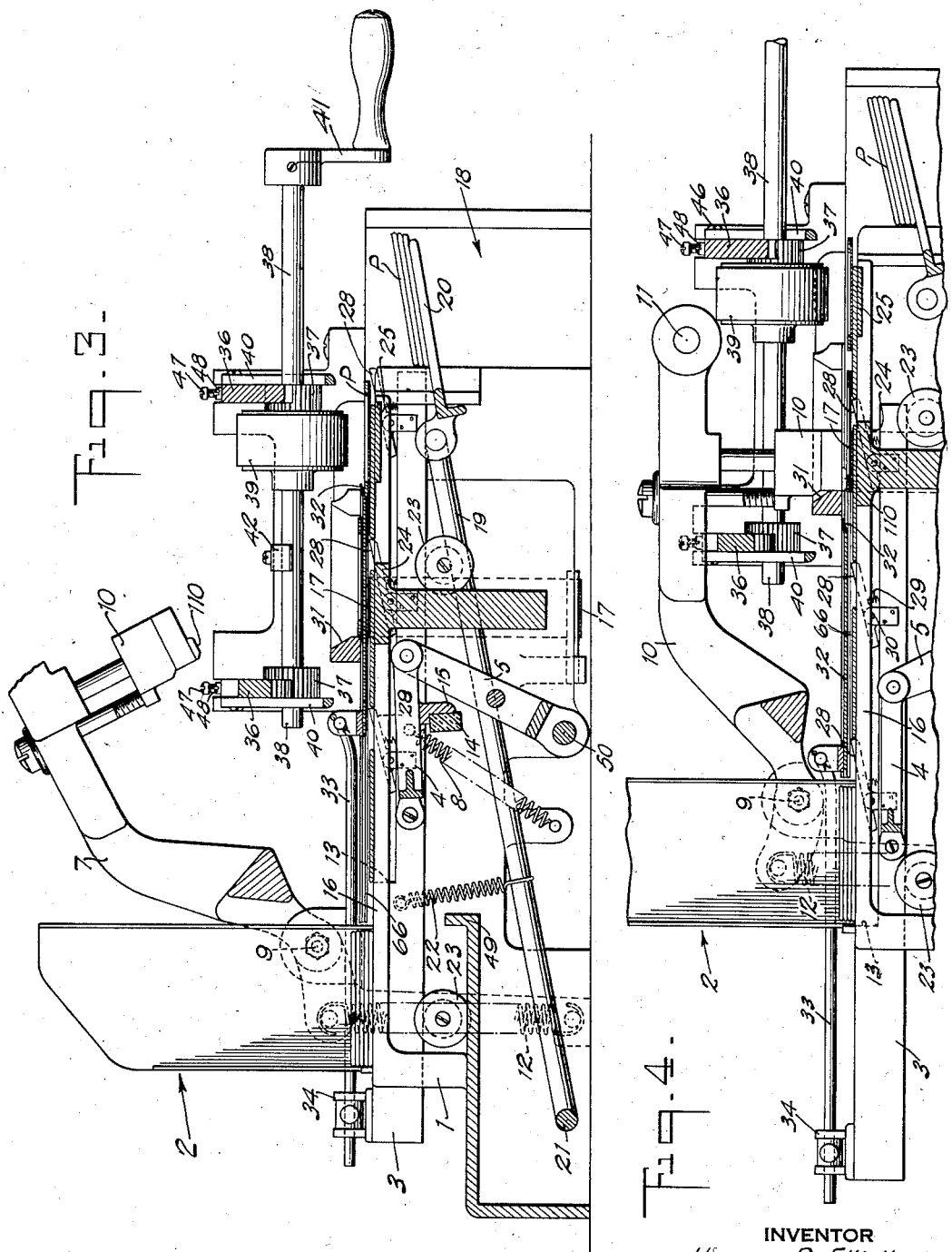
INVENTOR
*Harmon P. Elliott.*
BY
ATTORNEY Nov. 26, 1935.  H. P. ELLIOTT  2,022,540
APPARATUS FOR CUTTING STENCIL CARDS FROM TYPE PLATES
Filed Nov. 10, 1933  4 Sheets-Sheet 3
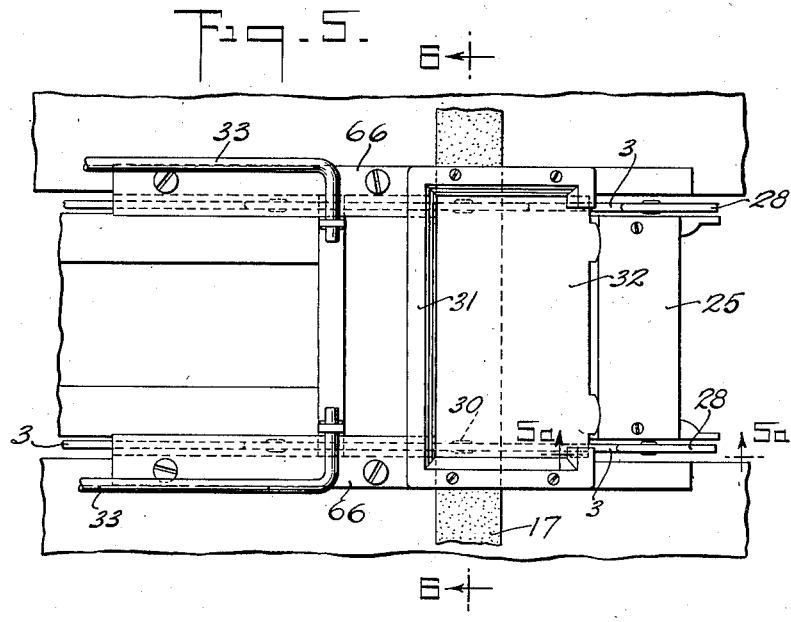
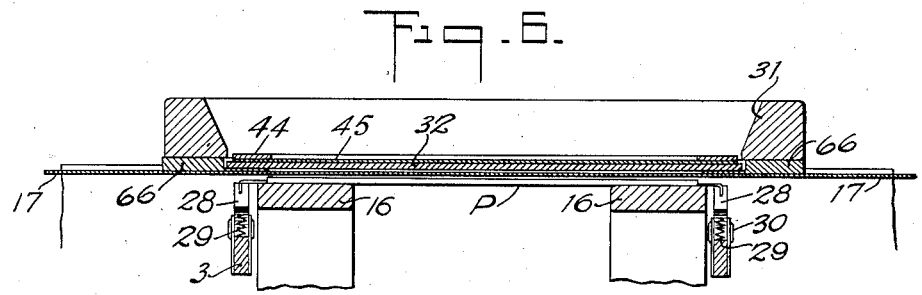
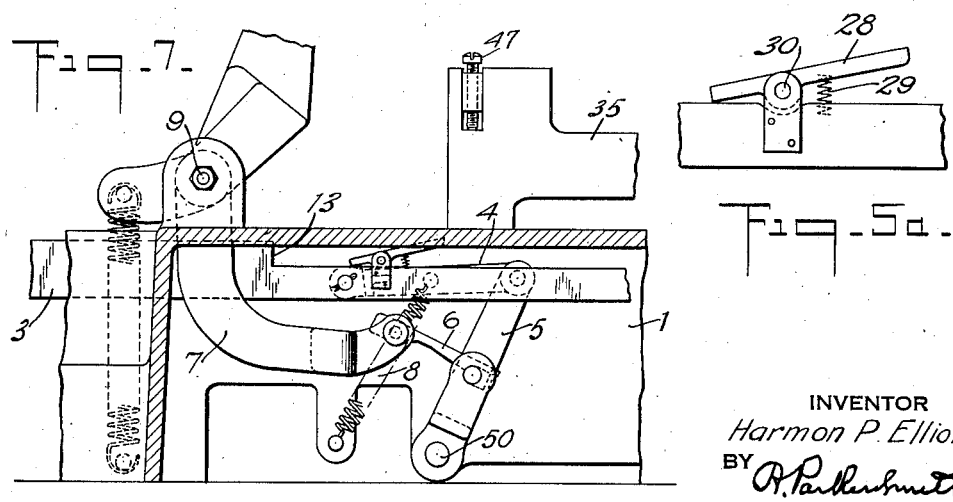
INVENTOR
Harmon P. Elliott.
BY
ATTORNEY

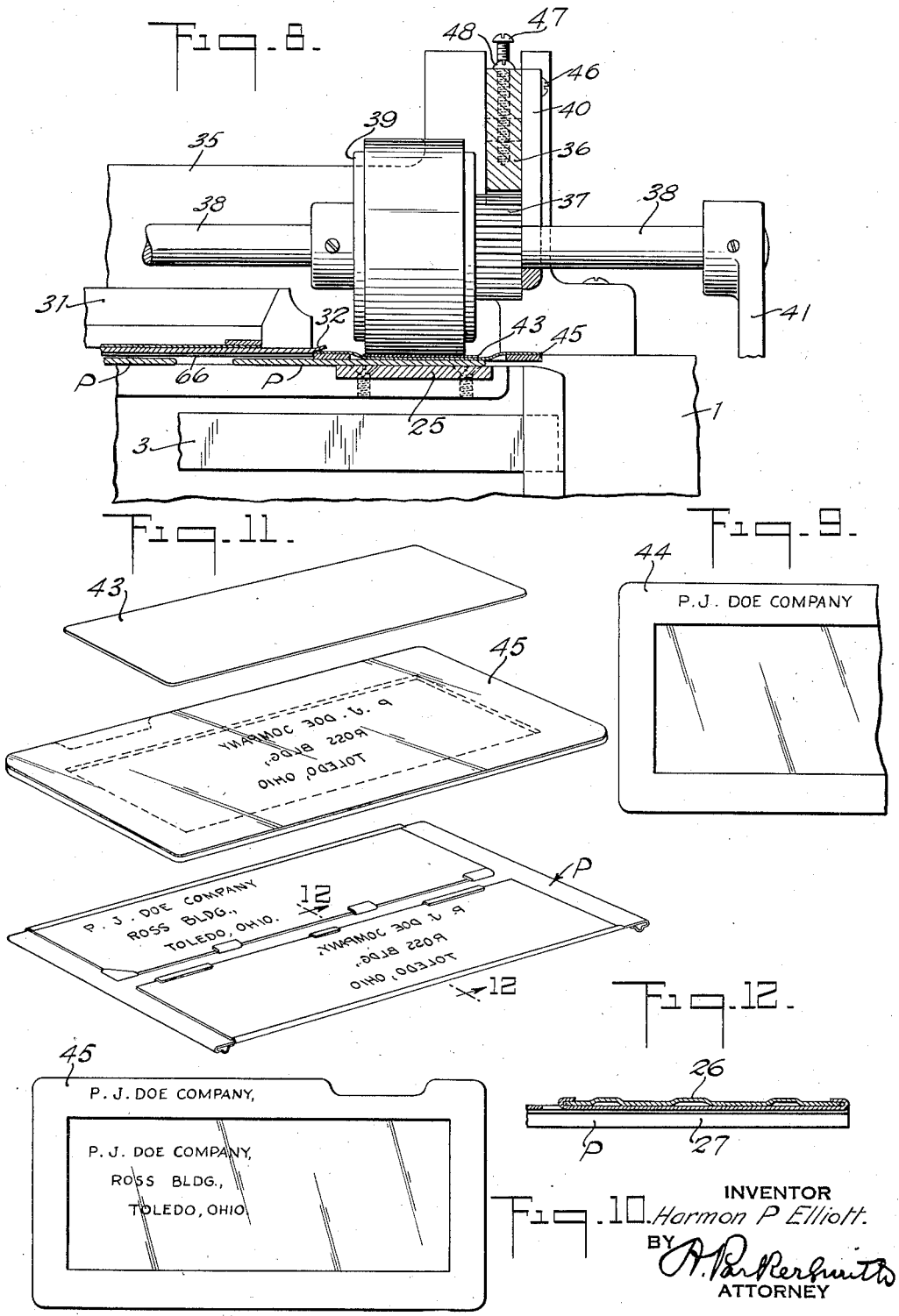

Patented Nov. 26, 1935

2,022,540

UNITED STATES PATENT OFFICE 2,022,540

APPARATUS FOR CUTTING STENCIL CARDS FROM TYPE PLATES

Harmon P. Elliott, Watertown, Mass., assignor to The Elliott Addressing Machine Company, a corporation of Massachusetts Application November 10, 1933, Serial No. 697,406

10 Claims. (Cl. 101—47)

This invention relates generally to stencil cards such as are used in addressing machines, and to methods and apparatus for making such stencils, but more specifically the invention relates to an improved form of such stencil card in which the name of the addressee is printed in ink on the marginal frame of the stencil card while a facsimile of said name together with the post office address of the addressee are cut in the stencil panel proper of the card.

The invention also relates to an improved method of cutting the stencil portion proper in the panel of the card by means of fixed type in plate form as distinguished from the more generally used method of cutting said stencils by means of the individual type on a standard typewriting machine.

The invention also comprises a special method of cutting such stencils by means of mechanism for applying a laterally shifting line of pressure moving across the exposed surface of a stencil blank resting on the type faces.

The invention also comprises improved apparatus by which metal plates may be fed from a magazine containing them one by one to a station where the name of the addressee is printed in ink upon the frame of a paper stencil card placed over the type plate, and then, at the next operation, in which another type plate is fed into said first position, the stencil blank on which the name of the addressee on the previous plate has been printed is automatically advanced to a second station together with said type plate and placed in proper registry therewith, so that upon the application of pressure to the exposed surface of the panel of the stencil blank the entire legend appearing on the type plate will be cut in such stencil blank, thereby producing a completed stencil card for addressing machine use having a facsimile of the name of the addressee printed in ink upon the face of the stencil frame.

The invention is still more particularly designed to utilize the millions of address bearing plates which are already in use, formed by embossing the outlines of the necessary type upon the surfaces of thin metal sheets, thereby enabling persons desiring to change over from this addressing system employing type plates to another system employing card stencils to easily reproduce in stencil form all the names and addresses embossed on their collection of address bearing plates. The stencil blanks used are formed of yoshino paper having a coating which can be displaced by type pressure to expose the loosely intermeshed fibres of the yoshino base so that ink can be easily forced through such exposed portions, thereby producing by the stencil printing operation a facsimile of the typed name and address originally embossed on the type plate.

In the preferred form of the present invention herein illustrated and described, also, an existing apparatus which has been on the market for some time and used in printing from these metal address plates, is utilized for the purposes of this invention by the addition of certain attachments which transform it from an address printing mechanism into a stencil cutting mechanism while at the same time printing a portion of the legend embossed on the plate upon the frame of such completed stencil.

The preferred form of stencil card embodying my present invention, and the preferred form of apparatus for making such completed stencils are illustrated in the accompanying four sheets of drawings, in which:

Fig. 1 is a plan view of a form of apparatus adapted for hand operation;

Fig. 2 is an end elevation of the same;

Fig. 3 is an enlarged longitudinal vertical section taken on line 3—3 of Fig. 1; and, Fig. 4 is a similar view showing the parts in another position of operation, parts being broken away;

Fig. 5 is a fragmentary plan view on the same scale as Figs. 3 and 4, showing portions of the stencil feeding mechanism in detail, Fig. 5a is a detail side elevation of one of the plate feeding claws shown on a larger scale.

Fig. 6 is a still further enlarged cross section, taken on a vertical plane passing through line 6—6 of Fig. 5;

Fig. 7 is a fragmentary vertical section taken on line 7—7 of Fig. 1, showing in detail a portion of the plate feeding mechanism;

Fig. 8 is a detailed fragmentary vertical cross section taken on the same plane as Figs. 3 and 4, showing more in detail the stencil cutting operation;

Fig. 9 shows a part of a stencil blank ready for stencil cutting after the first operation, that of printing the name of the addressee on the frame, has been completed, parts being broken away;

Fig. 10 is a face view of the completed stencil;

Fig. 11 is an assembled view showing in perspective a type plate, a back view of a cut stencil and the blanket strip 43 which has been used in the stencil cutting operation; and, Fig. 12 is an enlarged cross section of a portion of the type plate taken on line 12—12 of Fig. 11.

Throughout the drawings like reference characters indicate like parts.

The portion of the apparatus now and for some time in use in an addressing system employing type plates, and which by itself is not of my invention, will be first described, and the modifications and additional elements devised by me for enabling the basic apparatus so modified to embody and carry out my invention in the production of my improved stencil card by an improved method of operation, will be then explained more in detail.

Referring particularly to Figs. 3 and 4, a base for the apparatus is indicated at 1 supporting at the left hand end a magazine for metal type plates P, said magazine being indicated generally at 2. Endwise reciprocating pusher slide bars 3, 3, (see also Fig. 1) rest on anti-friction wheels 23, 23, and extend under the plate magazine 2 out along and slightly below the upper edge surfaces of the base frame 1. These bars are connected by a link 4 to the free end of vibrating lever 5 pivoted at 50 and oscillated by means of the link 6 connecting it to the lower end of the press frame 7 pivoted at 9 to the base frame and carrying the platen 10, said press frame being oscillated by the operator grasping the handle 11, best shown in Fig. 2. A tension spring 8 anchored on the base frame and connected to the link 4 holds the pusher slides 3 down upon the antifriction wheels 23 with a yielding pressure. Normally the press frame is held in the elevated position shown in Fig. 3 by means of the spring 12 connected to the rear end of the frame.

14 is a rubber bumper carried by lugs 15 on the pusher bars. When moved to the left with said bars it strikes stop 49 on frame 1. The left hand end of each pusher bar has a raised portion 13, which serves as a claw to pull out from the bottom of the stack of type plates the lowermost plate which has dropped in front of it during each reciprocation of said pusher bars to the left. 28, 28 are additional feed claws pivoted to the pusher bars at 30, 30 and having their forward ends normally held up by springs 29, 29 so as to engage the type plates when in their different stations of temporary rest to the right of the magazine, and successively advance plate from one such station to the next.

The normal operation of this portion of the apparatus will therefore consecutively feed out from magazine 2 the type plates stacked therein and advance them one by one first to a position below the platen 10, and subsequently to the remaining stations consecutively, said plates sliding along the rails 16, 16, best shown in Fig. 6. 24 is a cross bar on the base frame beneath the first above described position, and 17 is an inked ribbon extending across the face of the plate above said bar. Consequently, if an envelope or sheet of paper to be printed is placed over such type ribbon and the press frame 7 swung down, the downward pressure of the platen 10 will print the legend on the type plate on the under surface of such envelope or sheet, and on the upward movement of the press frame 7 certain of the pivoted claws 28, 28 engaging the plate will move it further to the right and on the next operation another set of such claws will push the plate into the receiving magazine 18, a fresh type plate being moved up to the printing station during each such cycle of operations.

19 is a tilting frame pivoted to the main base 21, normally held up with yielding pressure by spring 22 and having its free end 20 projecting into the receiving magazine 18. As the type plates P accumulate on this end of the frame it is gradually depressed by their increasing weight until the magazine is filled.

The standard form of type plate employed has raised, embossed type 26 as shown in Fig. 12, and downwardly bent end flanges 27, 27, which are engaged by the feed claws and also serve to hold the plates in registry with the supporting guides 16, 16.

The apparatus so far described has been in commercial use for some time, and one object of this invention is to so modify and extend its field of operation by simple mechanical additions as to enable it to print only the legend embossed on the upper line of the type plate, i. e. the name of the addressee, on the under face of the paper stencil blank placed over the type ribbon 17, without printing the other two lines of the legend on such stencil blank. A further object is to enable consecutive oscillations of the press frame occurring in subsequent cycles of printing operations to push each stencil blank, after a name has been thus printed on the frame, along to another station, together with the type plate beneath it, and to hold the stencil blank and type plate so assembled in registry with one another that when pressure is applied to the upper, exposed surface of the stencil blank the stencil panel, instead of the frame surrounding it, will be forced down upon the entire embossed surface of the type plate, with the result that the entire name and address embossed on the plate will be cut in the stencil and the latter, as a finished product of the operation, will then be ready for use in existing addressing systems employing card stencils, the stencil so produced also presenting the additional advantage of having the name of the addressee not only cut in the stencil panel, but also much more clearly appearing in facsimile in ink on the face of the upper portion of the frame of the stencil.

To assist in accomplishing the first above described desired result, (printing the name only, on the frame of the stencil blank), I provide a stencil guide frame 31 of substantially rectangular outline, placed over the type ribbon 17 and beneath the platen 10 in such registry with the platen that the latter will press the rear portion of the stencil frame down upon the type ribbon over the line of type spelling the name, but the thinner stencil panel not being pressed by such platen on the other two lines of type spelling the address. To further insure this limited area of printing, however, I provide the rear edge of the platen 10 with a strip 110 of rubber or other elastic material of sufficient width to register with the rear portion of the stencil frame only.

To feed the printed stencil blank forward after such printing in a readjusted and complete registry with the type plate, I provide a reciprocating stencil pusher plate 32 connected by rods 33, 33 with the pusher bars 3 by means of perforated lugs 34, 34, carried by the latter, and in which said rods 32 are held in adjusted position by set screws, as best shown in Fig. 1. Plate 32 reciprocates under guide frame 31, which is supported on the base frame 1 only at its ends. The cycle of operation next occurring after the above described printing will, therefore, push the stencil blank with the name printed on its frame and the type plate beneath it, into cooperating positions over the stationary cross strip 25, and, to then supply the pressure needed to cut the stencil by forcing it down upon its associated type plate, I mount upon the upper surface of the base 1 an extra frame or housing 35 of rectangular outline in which are mounted two cam racks 36, 36, one of which is most clearly shown in Fig. 2, and provide a pressure roller 39 rigidly mounted on shaft 38 which carries pinions 37, 37 meshing with said cam racks 36, 36. The pinions 37, 37 are held in constant engagement with the cam racks by the curved guide strips 40, 40 which are fastened at 46, 46 to the cam racks, and on which the shaft 38 may slide as it is rotated by the crank handle 41. Spring retainer clips 42, 42 are provided to hold shaft 38 and roller 39 in either position of extreme movement.

Preferably I employ a blanket strip 43 which is laid on the upper surface of the stencil blank 45 before pressure roller 39 is forced along its surface. The pressure of the roller 39 can be adjusted by adjusting the cam racks 36 by means of the screws 47 and 48, shown in Figs. 2 and 8. As shown, the screws 47 are the adjustable bearing screws set in the cam racks 36 with their lower ends in contact with the bottoms of the recesses in the housing or frame 35 prepared for the ends of the rack bars. After the proper adjustment of the cam racks has been obtained by moving screws 47, 47 up or down the parts are held rigidly together in such adjustment by screwing down screws 48, which go into the housing and serve to clamp the rack to it.

The complete method of operation of the apparatus may be concisely restated as follows: A former user of an addressing system employing type-plates in the base, hand-printing apparatus first above described, may use the modified form thereof last described to obtain, from the collection of type-plates containing his mailing list, a set of card stencils cut with the same names and addresses originally embossed on such metal plates. To do this the operator first stacks the metal type-plates in magazine 2, and oscillates the press frame 7 once, thus feeding the bottom plate of the stack into the first station between the magazine 2 and the guide frame 31. A second oscillation of the press frame feeds that plate under guide frame 31 and pulls out another plate from the magazine. The operator then places a stencil blank 44 in said frame 31, and on the next and third oscillation of press frame 7 the name on the plate is printed on the under surface of the frame of the stencil blank, and it, together with the type-plate beneath are fed forward to the third station under roll 39, while the second plate is moved up under guide frame 31, and a third plate from the stack is fed into the second position or station. The shaft 38 and roll 39 should then be at rest in one or the other extremity of their possible movement, being yieldingly held there by one or the other of the spring clips 42, 42, and after arrival of the stencil blank and type-plate in this third position the blanket strip 43 is placed on the upper, exposed surface of the blank and the crank handle 41 rotated so as to run the roll 39 over the blanket strip with a lateral dragging motion which presses the panel of the blank beneath the blanket strip down on the type-plate beneath it with great force, cutting in such stencil panel the entire legend embossed on the plate. The shaft 38 is then left in engagement with the other spring clip 42 ready for the next stencil cutting operation. This movement of roll 39 from one position to the other may be repeated, if desired, to insure a clear, clean cutting of the stencil. A second stencil blank is then placed in guide frame 31 over the second type-plate then in position beneath it. A fourth oscillation of press frame 7 then ejects the cut stencil, forces the plate beneath it into receptacle 18, feeds the second stencil and plate into cutting position for subsequent cooperation with roll 39, the third plate up into position under guide 31 ready to print the name of a third addressee on the frame of a third stencil blank when it has been placed in frame 31, and the platen 10 is swung down on it. This fourth oscillation of the press frame also feeds a fourth type-plate out of magazine 2, into the intermediate position between the magazine and guide frame 31. On each downward movement of platen 10 the stencil pusher plate 32 has moved away from under guide frame 31, so as not to interfere with the printing operation.

Various changes could be made in the stencil feeding and plate feeding and pressing mechanisms shown without departing from the underlying principles of the invention so long as the above described results are substantially secured.

Other kinds of stencil cutting pressure could be used in place of the peculiar wiping, traveling line of contact for such pressure produced by the rotating and sliding motion of roll 39, but I prefer that method of applying the stencil cutting pressure, as it gives most excellent results and requires the use of only the simple additional unit mechanism carried by housing 35.

As the correct adjustment of the blanket sheet 43 is a rather fussy job, I may substitute for it a blanket ribbon 53, shown in Fig. 2, which will be run under pressure roll 39 and be held under yielding tension so that when said roll is in either extreme position of operation a portion of such ribbon stretched over the type plate P will be held up high enough to permit the stencil blank 45 to be slid into position under it. Also, as about half a dozen successive stencil cutting operations frequently puncture the blanket sheet 45 or ribbon so that a new sheet, or another portion of the ribbon surface must be brought into operative position, I may provide some simple intermittently acting feed mechanism for gradually moving said ribbon along through the cutting zone in step by step movements occurring between each stencil cutting operation. A simple apparatus for doing this is schematically illustrated in Fig. 2 where the ribbon is shown as being unwound from a roll 54 rotating in the direction of the arrow against the pull of a small weight 56 suspended by cord 55 from the freely journalled shaft carrying roll 54, and the other end of said ribbon is shown at the left being wound up on another roll 57, the journal shaft of which is mounted in guides which permit it to rise and fall so that the roll rests on, and its movement is frictionally controlled by bearing roll 60 carried in fixed journal bearings beneath it. 59 is a weight much heavier than 56 and suspended by cord 58 wound on the journal shaft of roll 57 in such direction that the greater pull of weight 59 will tend to wind the ribbon up into roll 57 and out of roll 54. This winding and unwinding operation may be controlled by any suitable escapement mechanism engaging the shaft of roll 60. Such an escapement mechanism of the kind used in clockwork is indicated generally at 61, the free end of the escapement lever carrying an eye 64 through which slides one end of rod 62, the other end of which is loosely pivoted on shaft 38 of the roll 39. Tappet buttons 63, 63, are so adjusted on rod 62 that the lefthand one will strike eye 64 shortly before shaft 38 reaches the right hand limit of its movement along under cam rack 36. Similarly the right hand button 63 will strike the other side of eye 64 shortly before the shaft 38 reaches the extreme left-hand limit of its movement. As a result the escapement will be operated once for each complete movement of shaft 38 and the weight 59 thereby permitted to wind up roll 57 to a predetermined extent and slightly shift the section of ribbon 53 which is to be pressed down upon the next stencil blank and plate brought into stencil cutting position. When the ribbon 53 has all been unwound from roll 54 and into roll 57 the journal shafts supporting them may be lifted out of their bearings and reversed in position so that (the weights 56, 59 being also shifted) the ribbon 53 will again be drawn through the stencil cutting zone.

In Fig. 5 are shown in detail slotted guides 66, 66, along which the stencil feeding plate 32 is reciprocated by the connecting rods 33, 33, as hereinbefore described.

Having described my invention, I claim:

1. In an apparatus for cutting a paper stencil by means of fixed type, the combination of a magazine for type plates, means for feeding a series of type plates successively from such magazine to a stencil cutting station, and mechanism for applying a laterally shifting line of pressure to the exposed surface of a stencil blank resting on the type faces of such plate comprising a roll, a shaft carrying said roll, a pinion on said shaft, and an overhanging cam rack along which said pinion rolls in intermeshed relation with said rack when said shaft is rotated.

2. In an apparatus for cutting a paper stencil by means of fixed type, the combination of a magazine for type plates, means for feeding a series of type plates successively from such magazine to a stencil cutting station, and mechanism for applying a laterally shifting line of pressure to the exposed surface of a stencil blank resting on the type faces of such plate comprising a roll, a shaft carrying said roll, a pinion on said shaft, and an overhanging cam rack along which said pinion rolls in intermeshed relation with said rack when said shaft is rotated, said roll being rigidly fixed to said shaft so as to rotate therewith during reciprocation thereof along said rack.

3. In an apparatus for feeding consecutively a series of plates each bearing several lines of type into printing position and printing a portion of the legend so appearing on each type-plate upon one portion of a stencil blank comprising a magazine for such plates, guides along which they may be slid one by one from the bottom of said magazine to a printing position, mechanism for intermittently so feeding such plates along said guides, an ink ribbon stretched across such printing position above each plate when located therein, and a reciprocating platen adapted to be periodically swung down toward each plate when in such printing position, the combination, with said above described apparatus, of a holder for a card stencil blank having a horizontally extending rectangular panel opening into which such card fits closely located over such ribbon and so adjusted that a stencil blank formed of a thin stencilizable panel and a thicker surrounding rectangular frame will, when inserted in said holder, have one portion of such frame located over only one line of type on such plate; whereby, when said platen is depressed, said line of type will print on said stencil blank frame, but the portion of the ink ribbon not in registry with such type line will not be pressed against the other portion of such stencil blank and therefore no printing will be done over such other areas.

4. A combination such as defined in claim 3 in which the portion of the platen face coming into registry with such type line to be printed is provided with a thin strip of elastic material having a projecting face registering with such type line only.

5. An apparatus such as defined in claim 3, combined with mechanism for feeding both such plate and stencil blank after such printing operation away from said ink ribbon and into a second position while relatively readjusting the two so that the entire printing area on the face of the plate will then register with the panel of the blank adapted to be formed into the stencil proper, and means for pressing such panel down upon such plate; whereby the entire legend appearing in type on such plate will then be cut in such panel and a stencil thereby produced.

6. An apparatus such as defined in claim 3, combined with mechanism for feeding both such plate and stencil blank after such printing operation away from said ink ribbon and into a second position while relatively readjusting the two so that the entire printing area on the face of the plate will then register with the panel of the blank adapted to be formed into the stencil proper, and means for pressing such panel down upon such plate; whereby the entire legend appearing in type on such plate will then be cut in such panel and a stencil thereby produced, said stencil-blank feeding-mechanism comprising a plate rigidly connected to said plate feeding mechanism and reciprocable along, but spaced slightly away from, said guides.

7. The combination, with means for feeding a type-plate along a predetermined path, of a device for guiding a stencil card blank into one position of registry with such plate, means for printing on a portion of such card from a portion of such plate while in such position, mechanism for readjusting such card and plate in different relative positions such that the entire legend on the plate will then register with the stencilizable portion of said card, and apparatus for pressing the two together with force sufficient to cut such legend in such blank and thereby form the same into a stencil adapted to print such entire legend.

8. The herein described apparatus for cutting paper stencils which comprises a type plate on which appears the legend to be stenciled, means for holding a stencil blank over said type plate, a blanket sheet held loosely upon the exposed surface of such stencil blank when the latter is resting on said type plate, and a superposed member having an under surface which is adapted to bear upon said blanket sheet along a relatively narrow area extending across the same, together with means for both pressing said member down upon said blanket sheet and moving its surface forming said contact area with reference to said blanket surface in a direction at right angles to the major dimension of said area at a predetermined speed considerably in excess of any simultaneous motion of translation of said member; whereby a pronounced rubbing action of said member on said blanket is produced at points progressively shifted thereover.

9. An apparatus such as defined in claim 8 in which said means comprises a roll and mechanism for simultaneously rotating it and giving it a motion of translation over the surface of said blanket.

10. A process for producing a card stencil having a thin stencilizing panel presenting a legend to be stenciled arranged in a plurality of parallel lines, and one line of such matter also appearing on a portion of the blank of non-stencilizable character, which process comprises cutting such entire legend in such stencilizing panel at one operation, and printing in ink one line of such legend in facsimile upon such other portion in another operation.

HARMON P. ELLIOTT.